United States Patent [19]

Van Rooij

[11] Patent Number: 4,750,779
[45] Date of Patent: Jun. 14, 1988

[54] VEHICLE WITH A CABIN ENCASEMENT WITH INTERNAL REINFORCING ELEMENTS

[75] Inventor: Arnoldus J. M. Van Rooij, Geldrop, Netherlands

[73] Assignee: Volvo Car, B.V., Helmond, Netherlands

[21] Appl. No.: 20,792

[22] Filed: Mar. 2, 1987

[30] Foreign Application Priority Data

Mar. 4, 1986 [NL] Netherlands ............... 8600543

[51] Int. Cl.⁴ .............................................. B60J 5/04
[52] U.S. Cl. ................................... 296/188; 296/146; 49/501
[58] Field of Search .................. 296/189, 188, 146; 188/268; 49/502, 501

[56] References Cited

U.S. PATENT DOCUMENTS

| | | | |
|---|---|---|---|
| 3,868,141 | 2/1975 | Johnson | 296/146 |
| 3,938,288 | 2/1976 | Roubinet | 296/146 |
| 4,013,317 | 3/1977 | Reidelbach et al. | 296/146 |
| 4,090,734 | 5/1978 | Inami et al. | 296/146 |
| 4,307,911 | 12/1981 | Pavlik | 296/188 |

Primary Examiner—Robert R. Song
Attorney, Agent, or Firm—Pennie & Edmonds

[57] ABSTRACT

An improved door for a motor vehicle is disclosed which features a transverse stiffening element. The element comprises a pretensioned panel spaced between bearer members such that upon impact its resistant to buckling increases, rather than the reverse, as in the case of conventional box-like stiffening members.

6 Claims, 1 Drawing Sheet

VEHICLE WITH A CABIN ENCASEMENT WITH INTERNAL REINFORCING ELEMENTS

BACKGROUND OF THE INVENTION

The invention relates to a vehicle with a cabin at least one part of which consists of a frame which is provided with an outer sheathing of relatively thin material, in particular metal, at the outside and comprises at least one reinforcing element at the inside; the invention also relates to a door for such a cabin and to a method for manufacturing and providing a reinforcing element.

With a vehicle, in particular an automobile, provided with a cabin the aim is to protect its passengers as well as possible from the consequences of a collision. Measures have been taken, therefore, such as reinforcing the chassis, introducing crushable zones in the carrying parts, reinforcing the bumpers etc. The construction of the cabin itself, however, always remains a weak point. Of course it is possible to construct it from very strong material e.g. thick sheet material, but this has of course disadvantageous consequences both with regard to the price of the vehicle and the performance to be achieved with it. A particularly weak spot thereby are the doors. These are especially lack resistance to collisions in transverse direction. Many measures have already been taken, therefore, to bring about improvement in this. As is well-known the door of a modern vehicle consists of a frame, which is covered at the outside by sheathing of relatively thin material such as metal or plastic material. The door thereby forms a box, as it were, and in its interior mechanisms are disposed for operating a lock and moving a window e.g. of glass. Said window is moved up-and-down in the box-shaped space.

In order to reinforce the door against lateral impacts it has been proposed to provide reinforcing elements in the interior, i.e. in the box-shaped space. Said reinforcing elements consist of e.g one or more box girders, provided in the longitudinal direction of the vehicle, which are fixed to the sides of the frame of the door. A disadvantage inherent in using such box girders is that they need to have a relatively large section in order to incorporate the desired resistance against lateral impacts. If they are too weak namely, i.e. their section is too small, they will easily buckle under a relatively small lateral impact, and can as a result involve more serious consequences than if they were not present. In most cases there is too little room in the doors for box girders with a large section because of the necessary provision of the above-mentioned moving elements and the window. In order to meet these disadvantages to a certain extent it has been proposed to use sheet material with a transverse profile, e.g. being corrugated. Such a construction, however, is relatively costly, i.a. because the fixation to the side parts of the frame of the door is relatively difficult. Nor does it entirely remove the disadvantage of buckling under a severe lateral impact.

SUMMARY OF THE INVENTION

The aim of the invention is to avoid the above-mentioned disadvantages as well as possible without having to use extremely costly and/or heavy constructions.

A vehicle according to the invention is provided with a cabin at least one part of which, in particular a door, consists of a frame which is provided with sheathing of relatively thin material, in particular metal or plastic material, at the outside and accomodates at least one reinforcing element at the inside suitable for taking up and cushioning impacts in the transverse direction, for the protection of the interior of the cabin, and is characterized in that the reinforcing element(s) consist(s) of at least two substantially parallel bearers carring therebetween a pre-tensioned flat sheet of metal or plastic material.

Because of the use of a flat sheet only a small part of the space in the door is taken up by the reinforcing element. It is true that also the bearers, which have to be fixed to the frame of the door, are necessary but these bearers may be considerably thinner in transverse direction than the reinforcing box girders or the profiled plates usual up to now.

It is a matter of course that according to the invention also other parts of the cabin besides the door may be provided with the reinforcing elements according to the invention.

According to a preferential embodiment of the present invention the reinforcing element consists of a separate structure which forms a so-called subframe. Said subframe thereby consists of the two substantially parallel bearers, the flat sheet and cross elements for maintaining the spacing between the bearers. Such a subframe may be constructed outside the door after which the entire subframe is placed in the door at a suitable moment and is fixed to the sides of the frame of the door. Although this is not necessary the flat sheet may thereby be fixed to the two parallel bearers as well as to the cross bearers and be pre-tensioned in both directions.

Using a pre-tensioned sheet according to the invention has the special advantage that in case of an impact in transverse direction, whereby the sheet is indented, the resistance constantly increases with the indentation. This is contrary to what happens when box girders are used, as they eventually buckle at a given point, after which their resistance to further bending decreases sharply, so that the passengers of the cabin even run a greater risk than when such a reinforcement is absent.

BRIEF DESCRIPTION OF THE DRAWINGS

The invention will be further explained with reference to a drawing whereby a door construction has been taken as an example.

The drawing illustrates in.

DESCRIPTION OF THE PREFERRED EMBODIMENT

Figure 1:
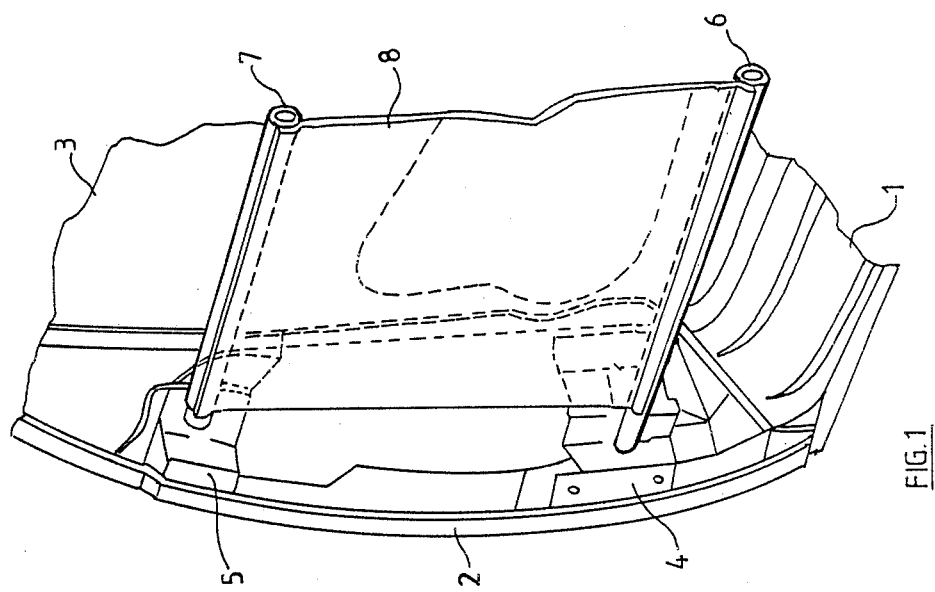
FIG. 1 a perspective view of a part of the door whose outer plating has been removed, and in FIG. 2 a construction of a subframe to be fixed in a door construction.

In FIG. 1 the door construction consists of a bottom 1, a transverse side 2 and an inner side 3. Together they form a box construction. Only part of said box construction is illustrated; opposite the transverse part 2, i.e at the right-hand side on the drawing, there is also located a transverse part of the frame of the door. This part may have the same shape as the part 2 or a different shape. As is well-known the doors of a vehicle are only rarely identical at the two upright sides. For the invention this is of no significance. Fixed to the side 2, e.g. by welding, are the supporting elements 4 and 5. Fixed to said supporting elements 4 and 5, e.g. also by welding, are two longitudinal bearers 6 and 7 running substantially parallel. In the illustrated embodiment said longitudinal bearers are tubular; this is not necessary, however. They can also be formed by flat metal strips. Located between the bearers 6 and 7 is the sheet 8 which is fixed, in pre-tensioned condition, to the bearers 6 and 7. If said sheet 8 is made of metal, it may be fixed to the bearers 6 and 7 by welding; if the sheet 8 is made of plastic material the connection may be effected wih a suitable glue. In each case the sheet 8 is fixed to the bearers 6 and 7 in pre-tensioned condition.

Figure 2:
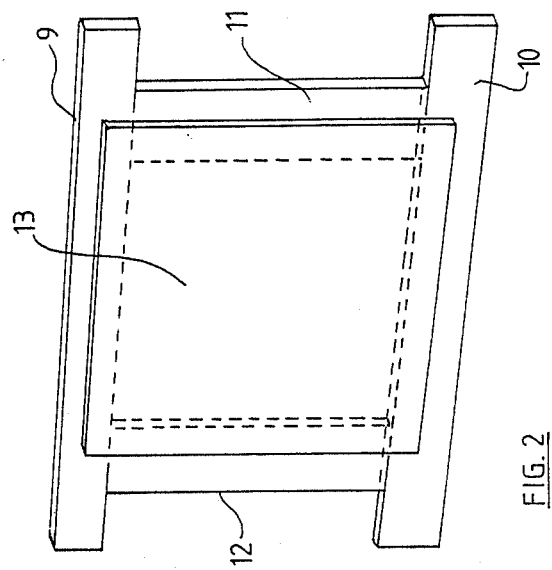

With the embodiment illustrated in FIG. 1 the bearers 6 and 7 are fixed to the frame of the door before the sheet 8 is fixed to said bearers. Under certain circumstances the fixation of the pretensioned sheet 8 to the bearers 6 and 7 may be relatively difficult. Therefore, a subframe is made according to a special embodiment of a construction according to the invention, which will be explained with reference to FIG. 2. Said subframe consists of the two parallel bearers 9 and 10, the distance between which is maintained by the cross elements 11 and 12 which are fixed to the elements 9 and 10 e.g. by welding. Fixed to the subframe thus produced is the pre-tensioned sheet 13. The pre-tension may be given both in vertical and in horizontal direction. The entire subframe may be produced separately outside the door construction and be placed in the door after production in a manner which corresponds with the fixation of the bearers 6 and 7 of FIG. 1.

It should be noted that the internal reinforcement of the side wall and the door(s) does not only protect the passengers in case of lateral collision, but also provides protection in case of a frontal collision and/or a collision from the rear.

The reinforcement makes the cabin into a so-called cage, whereby after a collision in longitudinal or transverse direction it will still be possible to open the door(s) as a result of the built-in reinforcement. The subframe with the two horizontal bearers and the pretensioned sheet increases the rigidity of the door in two principal directions. The bearers hereby increase the resistance to pressure in longitudinal direction.

I claim:

1. A door for a motor vehicle, comprising:
   a frame;
   an outer and inner sheathing which together with said frame define a substantially closed structure; and
   a reinforcing element mounted between spaced opposing portions of said frame and within said closed structure;
   wherein said reinforcing element comprises first and second spaced bearer members affixed to said spaced opposing portions of said frame and a pretensioned sheet of material extending between said bearer members and maintained in said pretensioned state thereby.

2. The door of claim 1 wherein said reinforcing element further comprises first and second cross members extending between said bearer members to exert pretensioning force on said sheet.

3. The door of claim 2 wherein said sheet is affixed to said cross members as well as said bearer members.

4. The door of claim 3 wherein a transverse pretensioning force is exerted on said sheet by said cross members in addition to said force exerted thereon by said bearer members.

5. The door of claim 2 wherein said bearer members, said cross members and said sheet are assembled into a subframe and subsequently affixed to the frame of said door.

6. The door of any one of claims 1–5, in combination wih a vehicle.

* * * * *